Figure 1:
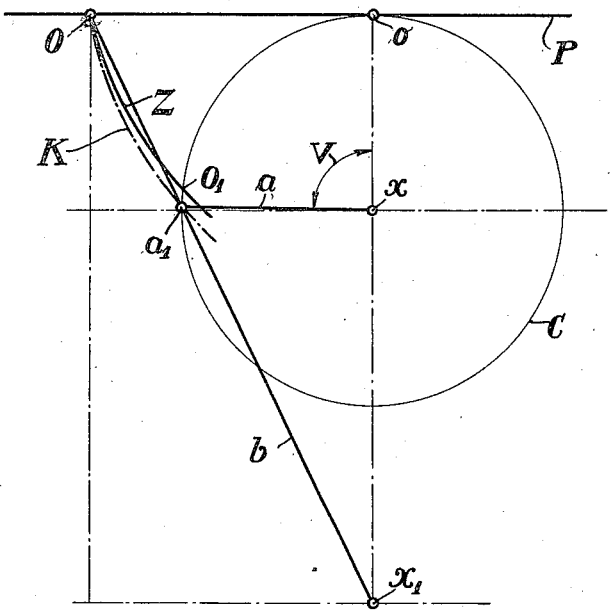

July 31, 1923.

S. G. WINGQUIST 1,463,414

MACHINE FOR MANUFACTURING TOOTHED WHEELS, SCREW WHEELS, OR THE LIKE

Filed March 2, 1921    4 Sheets-Sheet 1

INVENTOR
S. G. Wingquist.
By Rogers, Kennedy & Campbell
Attys.

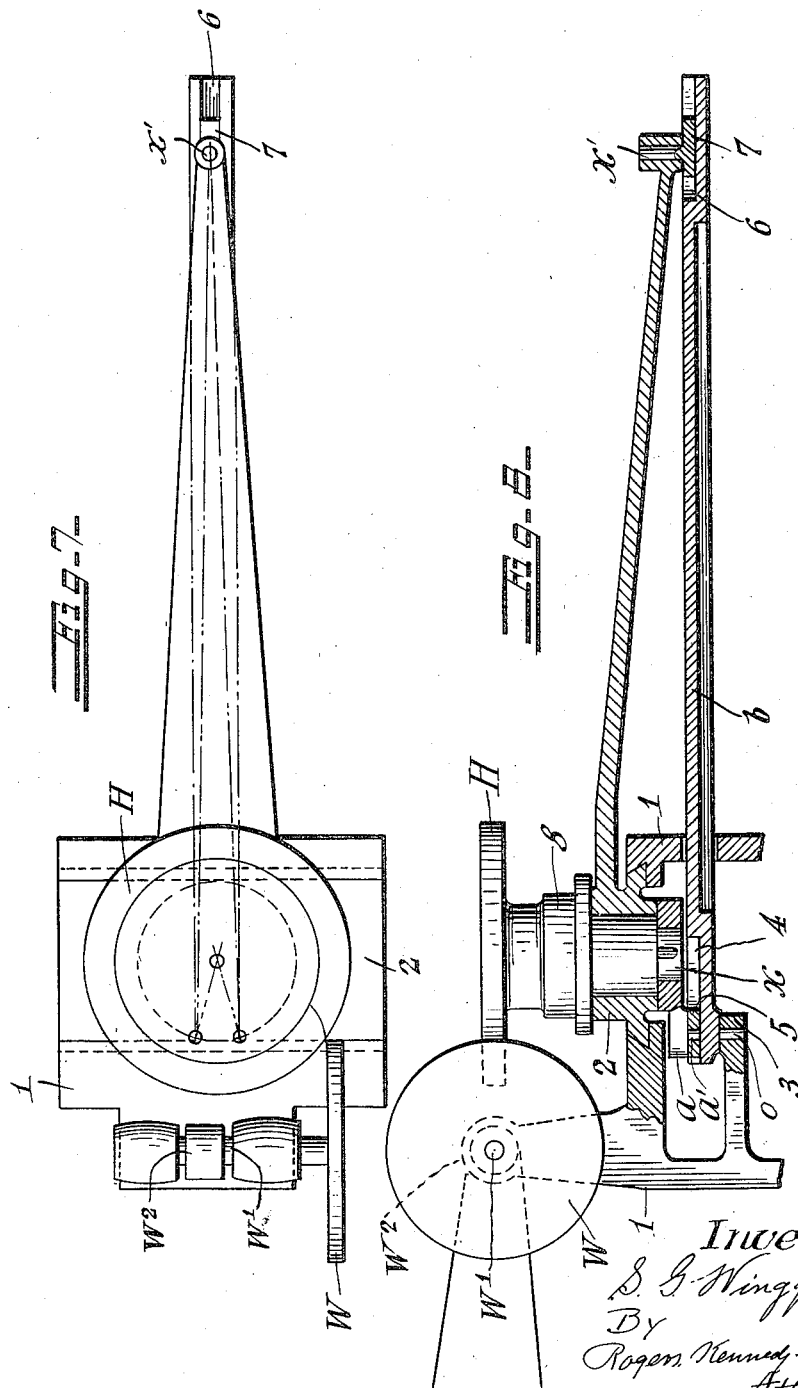

Patented July 31, 1923.

1,463,414

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

MACHINE FOR MANUFACTURING TOOTHED WHEELS, SCREW WHEELS, OR THE LIKE.

Application filed March 2, 1921. Serial No. 449,007.

*To all whom it may concern:*

Be it known that I, SVEN GUSTAF WING-QUIST, a subject of the King of Sweden, residing at Gottenborg, in the Kingdom of Sweden, have invented new and useful Improvements in Machines for Manufacturing Toothed Wheels, Screw Wheels, or the like, of which the following is a specification.

This invention relates to machines for manufacturing toothed wheels, worm wheels or the like according to the rolling principle or according to any other principle in which the relative rolling movement of the cutting tool with respect to the wheel blank is effected by means of a system of suitably arranged links. An indispensable requirement which must be satisfied in order that such motion transmitting devices shall give a practically sufficient result as to the tooth-profile generated, involves that the angles of the rolling movement are given comparatively small values, as in the case of greater angles of rolling the movement controlled by the link system will not be a pure rolling movement, but a combined sliding and rolling movement. In machines as heretofore known, having a link system for controlling the relative rolling movement of the wheel blank with respect to the cutting tool, the said movement has taken place between a position representing the normal or zero position of the link system, and an end position corresponding to the necessary angle of rolling in each case. The machines are, in other words, so constructed that the whole rolling movement will take place at one and the same side of the normal position of the link system, and as a result the tool has been placed in the point where the rolling movement begins as determined by the link system. By such an arrangement of the link system as well as of the cutting tool, however, it was not possible to keep the angles of rolling within the limits giving practical results and, owing to this, machines having link motions of the kind above described, have not been practical. This invention has for its object to enable the use of comparatively large angles of rolling without causing the irregularity to exceed the practically allowed limit. This result is obtained according to this invention by placing the cutting tool at the side of the point where the rolling movement begins as determined by the link system and by causing the rolling movement to take place at both sides of the normal position of the link system. The tool may, preferably, be situated at a distance from said point which is equal to half the distance between the two end positions of the link system, and the rolling movement may, preferably, take place symmetrically at both sides of the normal position of the link system.

Figure 2:
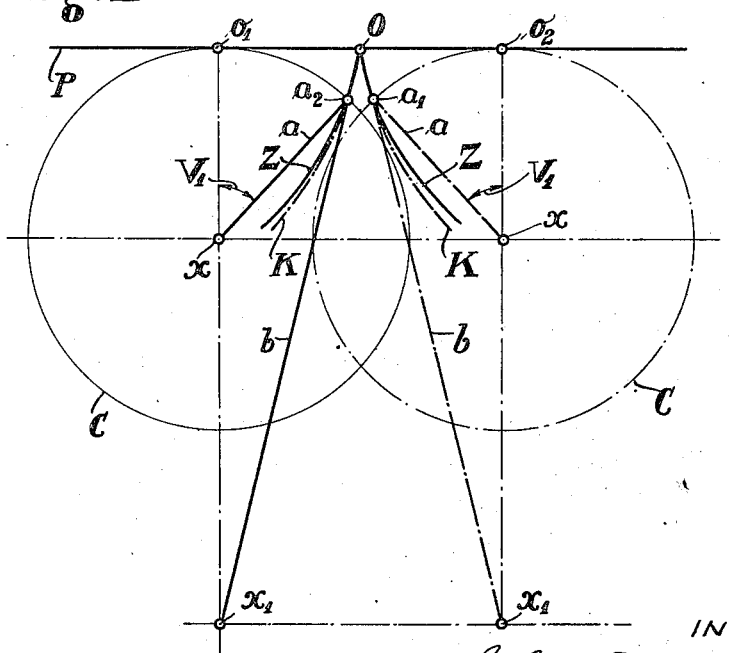
Figure 3:
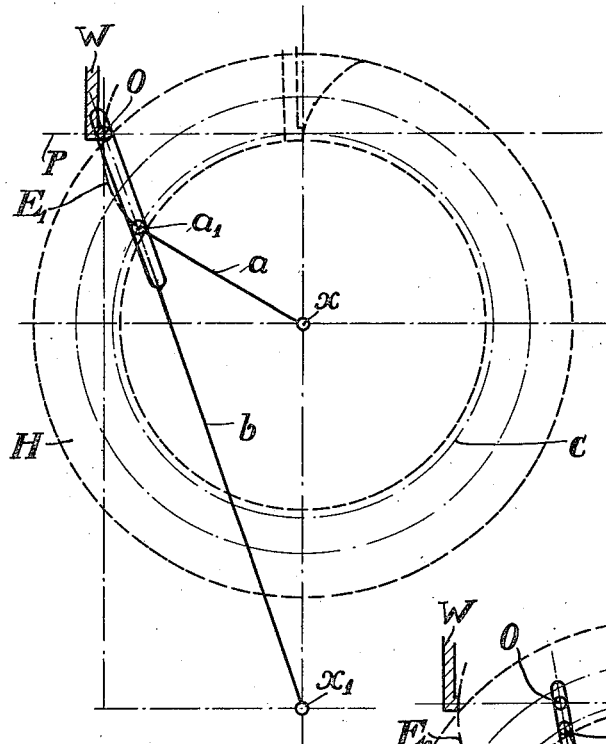
Figure 4:
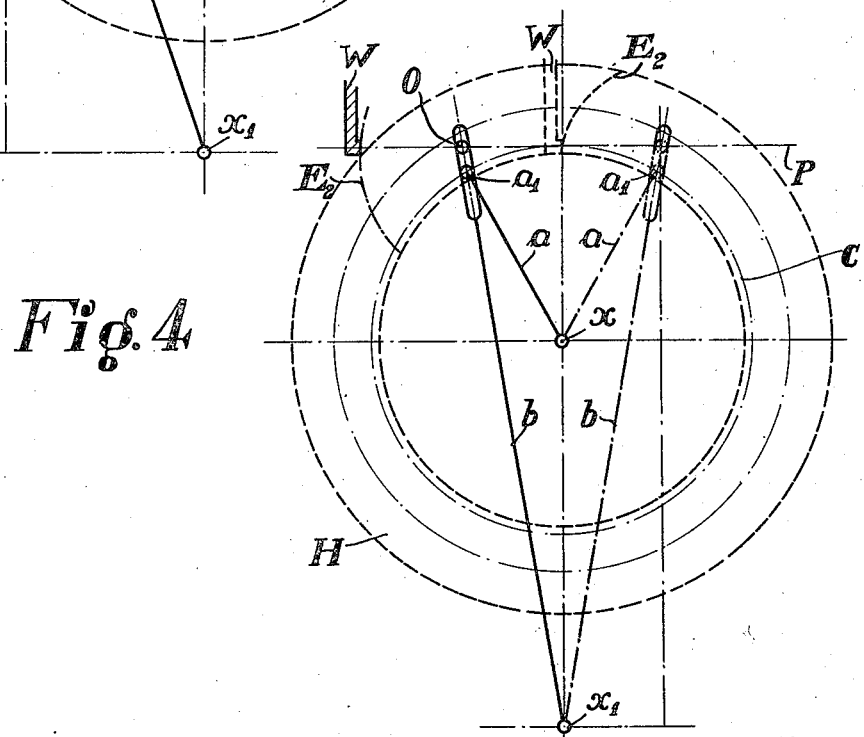
Figure 5:
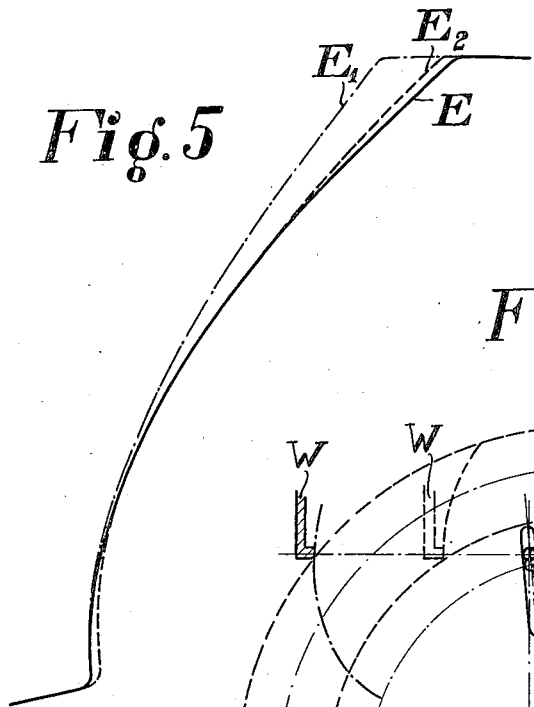
Figure 6:
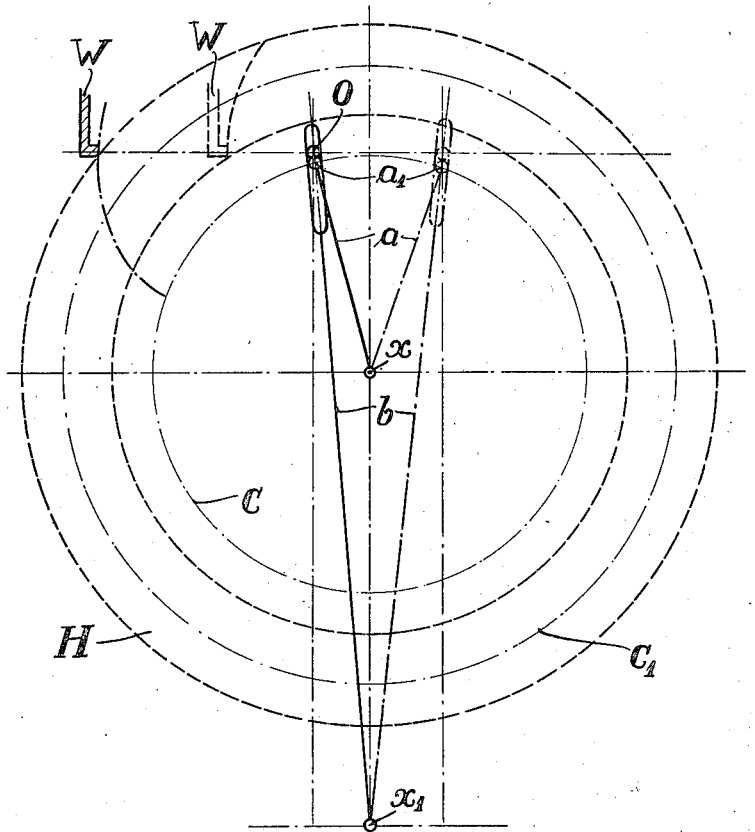

The invention is illustrated in the accompanying drawings. Fig. 1 is a diagrammatic view of a well-known link system. Fig. 2 illustrates in a diagrammatic manner an arrangement of the link system according to this invention. Fig. 3 illustrates diagrammatically the use of the known link system in a machine for manufacturing spur gear wheels. Fig. 4 illustrates in a diagrammatic manner the use of the link system in a machine according to this invention. Fig. 5 shows different tooth-profiles. Fig. 6 shows a modified arrangement of the link system according to this invention. Fig. 7 is a top plan view of a machine having incorporated therein a link system according to Fig. 4. Fig. 8 is a side elevation of the machine of Fig. 7 partly in section.

The well-known link system shown in Fig. 1 by means of which the cylinder C is given a rolling movement on the surface P, comprises two links $a$ and $b$, of which the link $a$ is rigidly connected to the axis $x$ of the cylinder $c$ and has a length corresponding to the radius of the cylinder, while the link $b$ which is pivotally and slidably connected to the link $a$ at $a_1$ is provided with an axis $x_1$ stationary with respect to the axis $x$ the said link $b$ being further pivotally and slidably guided at the point O where the rolling movement begins. To obtain an ideal rolling movement as far as possible, the length of the link $b$ or the distance between the points $x_1$ and O should be equal to or approximately equal to thrice the radius of the cylinder C. Assuming now, the cylinder C having rolled from the initial position O and into a position $o$, a point of the periphery of the cylinder, as, for instance, the point $O_1$ has described part of a cycloid Z. It is now readily understood that such an ideal rolling movement cannot be obtained by means of any known link system, and that the problem is to reduce the irregularity to a minimum as small as possible. Furthermore, it is seen that said irregularity will be increased with the angle of rolling. This is illustrated in Fig. 1 where the curve K indicates the path of the point $a_1$ during the movement of the cylinder C under the control of the link system $a$, $b$ from the initial position O and into the position $o$. As shown, the curves Z and K will coincide at and in the proximity of the initial point O while diverging from each other according as the angle of rolling V increases. In order that the link system shown in Fig. 1 may give practical results, the angle of rolling V, therefore, should be very small, or, in other words, it is necssary to limit the movement to a fairly small part of the curve K at and in the neighbourhood of the initial point O, where the curve K coincides fully or approximately with the ideal cycloid Z thereby making the irregularity exceedingly small at this point. As, however, comparatively large angles of rolling and in any case, angles larger than those obtainable by means of the link system $a$, $b$, will be used in practice, it is understood, that the link system shown has no practical importance.

The present invention permits of limiting the movement to the comparatively small part of the curve K above referred to while maintaining the comparatively large angle of rolling V shown in Fig. 1. It is evident that by said arrangement, a great advantage may be gained. This is obtained according to this invention by causing the rolling movement to take place at both sides of the normal position of the link system and preferably, as shown in Fig. 2, symmetrically with respect to said position so that the angles of rolling $V_1$ at either side of the neutral position will be equal to each other and each equal to half the angle V, Fig. 1. The total angle of rolling between the end positions $o_1$—$o_2$ of the cylinder C will, as is readily understood, be equal to the angle V, Fig. 1, the movement, however, having been limited as seen from the middle position O, to those parts of the acute curve K which practically coincide with the cycloid Z, that is, the movement of the cylinder C with respect to the surface P from the position $o_1$ and into the position $o_2$ corresponding to the movement from the position O and into the position $o$ in Fig. 1, will become a practically ideal rolling movement.

In the link systems shown in Figs. 1 and 2 the initial point O is asumed to be stationary and the rolling of the cylinder C on the plane surface P is accomplished by displacing the axes of rotation $x$ and $x_1$ with equal speed in a direction parallel to the surface P, that is in the direction of rolling. However, it should be noted, that in the above description there is only dealt with relative movements and that the same result may be obtained if, for instance, the axes $x$ and $x_1$ were stationary and the point O with the surface P were moved in the said direction. Such an arrangement is shown in Figs. 3 and 4.

In the well-known machine, diagrammatically shown in Fig. 3, for manufacturing cylindrical toothed wheels the axis of rotation $x$ of the wheel blank H as well as the axis of rotation $x_1$ of the link $b$ are assumed to be stationary, while the guiding point O of the link $b$ may be displaced along the imagined plane surface P. Placed in the point O is a tool W of any appropriate kind, as for instance, a cutting tool, a grinding disc or the like, moving with the point O. Assuming now that the wheel blank H is caused to rotate about its own axis $x$ and that the tool W is displaced along the surface P representing the tangent to the circle of rolling C, with a speed equal to the circumferential speed of the circle of rolling C, it is evident that the tool W will describe an ideal involute. If, on the other hand, the relative movement between the wheel blank H and the tool W be performed under the control of the link system $a$, $b$, the tool W will form a tooth-profile $E_1$ which, as stated in connection with the description of Fig. 1, will deviate considerably from the ideal involute. With the tool W placed at the side of the point O, Fig. 4, according to this invention and with the relative rolling movement being performed at both sides of the normal position of the link system, the tool W will form a tooth profile $E_2$ which as is stated in connection with the description of Fig. 2 will conform more accurately to an ideal involute.

With reference to Fig. 5, the character E indicates the ideal involute, $E_1$ is the tooth-profile which may be obtained with the known link system, and $E_2$ is the tooth-profile according to this invention. The deviations of the profiles $E_1$ and $E_2$ from the ideal involute E for the sake of clearness are shown as having an abnormal value. From this figure it will be seen that the profile $E_2$ is much more favourable than the profile $E_1$ the unavoidable error being not only considerably reduced as compared with that of the profile $E_1$ but also distributed towards the top and root of the tooth, so that the error at or near the middle section of the tooth will be zero. By suitable variation of the extension of the rolling movement at both sides of the normal position of the link system and by a corresponding change of the position of the tool it is possible to have the error placed at the top or at the root of the tooth at will, so that the profile at the top or at the root of the tooth will, practically, coincide with the ideal involute.

In the embodiment shown in Fig. 4 the tool W is assumed to move from an end position into another end position coinciding with the normal position of the link system. However, this is not necessary as the relative position of the tool with respect to the link system may, as stated, be chosen at will.

In Fig. 6 there is shown an embodiment of the invention in which the tool W is always situated at the side of the normal position of the link system. The distance between the tool W and the point where the rolling movement begins will in this case be equal to the distance between the normal position of the link system and the pitch-circle $C_1$ of the wheel blank as seen along the tangent to the rolling or base circle $C$ of the wheel blank along which the tool W is assumed to move. The tool W will, thus, intersect with the pitch circle $C_1$ of the wheel blank at the same time that the link system is in its normal position, thereby securing the essential advantage that the error will become zero just at the pitch circle where, as is well-known, pure rolling movement takes place between two cooperating teeth. At other portions of the tooth-profile there will also take place a sliding movement to a certain degree so that in the case of an error at those parts of the profile, wear to compensate for said error may more easily occur in working. The rolling movement will in this case be non-symmetrical with respect to the normal position of the link system.

The invention is especially applicable to such machines for manufacturing toothed wheels and the like, in which, as is shown in Figs. 4 and 6, the tooth-profile is generated by means of one and the same point, line or small surface of the tool which assumes a constant position with respect to the system of the tool and which is caused to move along the line of contact. The necessary angle of rolling will in this case be less than in machines working on the so called rolling principle.

In Figs. 7 and 8 there is shown a constructional form of the link system according to Fig. 4 incorporated in a machine. In these figures, 1 designates a frame carrying a slide 2 movable in the direction of rolling and forming a bearing for the shaft $x$ of the link $a$ as well as for the shaft $x'$ of the link $b$. The link $b$ is provided at one end with a pivot O mounted in a bearing 3 formed in the frame 1, and a seat or guideway 4 is formed in the link at the same end to receive a slide 5 carrying the pivot $a'$ of the link or crank $a$ which latter is connected at its opposite end to the shaft $x$. At its outer end, link $b$ has formed in it a guideway or seat 6 to receive a slide 7 which carries the shaft $x'$, so that upon the displacement of the slide 2, and the resulting swinging movement of the link $b$ about the fixed pivot O, the shaft $x'$ with the slide 7 may be displaced relatively to the link $b$.

Rigidly connected to the shaft $x$ of link $a$ is a table 8 to receive the wheel blank H to be rolled relatively to the tool by means of the link system. The tool in the present instance is in the form of a rotary grinding wheel W carried by a shaft $W'$ mounted in bearings in the frame 1 and provided with a pulley $W^2$ for rotating it.

The operation of the device corresponds in all essential particulars to that described in connection with Fig. 4 and briefly stated is as follows: The wheel blank H having been clamped to the table 8, and the grinding wheel W having been adjusted corresponding to the pitch circle of the wheel blank, the wheel is rotated and the slide 2 at the same time displaced slowly in its guides, which action will bring about a relative horizontal movement of the wheel blank with respect to the tool at both sides of the normal position of the link system, whereby a complete tooth space will be formed in the wheel blank.

It should be understood that the invention is not limited to the embodiment of the link system shown in the drawing, as it may be applied to any link system for controlling rolling movement. The invention may further be applied not only to machines for manufacturing spur gear wheels but also to machines for manufacturing bevel gear wheels, screw wheels or the like.

What I claim is:—

1. In a machine for manufacturing gear wheels according to the principle set forth, the combination with a tool of a link system to cause a relative rolling movement between the tool and a wheel blank to take place at both sides of the normal position of the link system, the tool being placed at a distance from the starting point for the rolling movement as determined by the link system.

2. In a machine for manufacturing gear wheels according to the principle set forth, the combination with a tool, of a link system to cause a relative rolling movement between the tool and a wheel blank to take place symmetrically at both sides of the normal position of the link system, the tool being situated at a distance from the starting point for the rolling movement as determined by the link system which is equal to half the distance between the end positions of the link system.

3. In a machine for manufacturing gear wheels according to the principle set forth, the combination with a tool, of a link system to cause a relative rolling movement between the tool and a wheel blank, the movement of the tool relatively to the wheel blank taking place within limits situated at the side of the normal position of the link system.

4. In a machine for manufacturing gear wheels according to the principle set forth, the combination with a tool, of a link system to cause a relative rolling movement between the tool and a wheel blank to take place at both sides of the normal position of the link system, the tool being situated at a distance from the starting point for the rolling movement as determined by the link system, which is equal to the distance from the normal position of the link system to the pitch circle of the wheel blank, as measured on the tangent of the wheel blank, along which the rolling movement may be assumed to take place.

5. In a machine for manufacturing gear wheels according to the principle set forth, the combination with a tool, of a link system to cause a relative rolling movement between the tool and the wheel blank to take place at both sides of the normal position of the link system, the tool being so arranged as to form the tooth-profile by causing one and the same point, line or small surface of the tool, having a constant position thereon, to move along the line of contact of the tooth-profile, In testimony whereof I have signed my name.

SVEN GUSTAF WINGQUIST.